United States Patent
Moon et al.

(10) Patent No.: US 8,206,576 B2
(45) Date of Patent: Jun. 26, 2012

(54) NICKEL BASED CATALYST USING HYDROTALCITE-LIKE PRECURSOR AND STEAM REFORMING REACTION OF LPG

(75) Inventors: Dong Ju Moon, Seoul (KR); Dae Hyun Kim, Seoul (KR); Jung Shik Kang, Seoul (KR); Jong Woo Ryu, Gwangju (KR); Byung Gwon Lee, Seoul (KR); Young-Seek Yoon, Daejeon (KR); Byong-Sung Kwak, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 691 days.

(21) Appl. No.: 12/090,315

(22) PCT Filed: Oct. 9, 2006

(86) PCT No.: PCT/KR2006/004047
§ 371 (c)(1),
(2), (4) Date: Jun. 5, 2009

(87) PCT Pub. No.: WO2007/046591
PCT Pub. Date: Apr. 26, 2007

(65) Prior Publication Data
US 2009/0261020 A1 Oct. 22, 2009

(30) Foreign Application Priority Data
Oct. 20, 2005 (KR) .................. 10-2005-0099208

(51) Int. Cl.
*C10G 50/00* (2006.01)
*B01J 21/02* (2006.01)
*B01J 23/755* (2006.01)

(52) U.S. Cl. .................. 208/137; 502/327
(58) Field of Classification Search .................. 208/137; 502/327
See application file for complete search history.

(56) References Cited

U.S. PATENT DOCUMENTS

| | | | |
|---|---|---|---|
| 3,791,993 A * | 2/1974 | Rostrup-Nielsen | 502/328 |
| 5,354,938 A * | 10/1994 | Audeh et al. | 585/724 |
| 5,439,861 A | 8/1995 | Bhattacharyya et al. | |
| 5,767,040 A | 6/1998 | Bhattacharyya et al. | |
| 6,071,433 A * | 6/2000 | Bhattacharyya | 252/373 |
| 6,680,006 B2 | 1/2004 | Chantal | |
| 6,953,488 B2 * | 10/2005 | Bhattacharyya et al. | 48/198.7 |
| 2002/0155329 A1 | 10/2002 | Stevens | |
| 2003/0005633 A1 | 1/2003 | Bhattacharyya et al. | |

* cited by examiner

*Primary Examiner* — David M Brunsman
(74) *Attorney, Agent, or Firm* — Frommer Lawrence & Haug LLP; Ronald R Santucci

(57) ABSTRACT

The present invention relates to a nickel-based catalyst using hydrotalcite-like precursor and a steam reforming reaction by using the catalyst, and particularly to a nickel-based catalyst prepared by dispersing nickel uniformly onto the inner part and the surface of the support through a substitution between the magnesium and the active nickel metal and optimizing the molar ratios of nickel, magnesium and aluminum in order to utilize nickel as an active metal and a hydrotalcite-like precursor consisting of aluminum and magnesium, which shows an increased specific surface area of the catalyst and surface area of the active nickel, and thus enables the production of hydrogen-rich gas in high yield during the steam reforming reaction of LPG with superior maintenance of catalytic activity for a long period of time due to the inhibition of carbon deposition.

6 Claims, 1 Drawing Sheet

NICKEL BASED CATALYST USING HYDROTALCITE-LIKE PRECURSOR AND STEAM REFORMING REACTION OF LPG

This application is a 371 of PCT/KR2006/004047 filed on Oct. 9, 2006, published on Apr. 26, 2007 under publication number WO 2007/046591 A1 which claims priority benefits from South Korean Patent Application Number 10-2005-0099208 filed Oct. 20, 2005, the disclosure of which is hereby incorporated by reference.

TECHNICAL FIELD

The present invention relates to a nickel-based catalyst prepared using hydrotalcite-like precursor and a steam reforming reaction by using the catalyst, and particularly to a nickel-based catalyst prepared by dispersing nickel uniformly onto the inner part and the surface of the support through a substitution between the magnesium and the active nickel metal and optimizing the molar ratios of nickel, magnesium and aluminum in order to utilize nickel as an active metal and a hydrotalcite-like precursor consisting of aluminium and magnesium, which shows an increased specific surface area of the catalyst and surface area of the active nickel, and thus enables the production of a hydrogen-rich gas with high yield during the steam reforming reaction of LPG with superior maintenance of catalytic activity for a long period of time due to the inhibition of carbon deposition.

RELATED PRIOR ART

Hydrogen is a fundamental raw material for industrial application, and may be used in almost every field such as energy, transportation and petroleum chemical process. In particular, hydrogen is most appropriate as a substitute energy for an existing fossil fuel energy system. Demand for hydrogen has been increased by 10-15% every year since 1998, and a sudden increase in hydrogen demand is expected in the fields of the hydrogen station for a fuel cell powdered vehicle and the fuel processor for a fuel cell when hydrogen economy society comes in the future.

Hydrogen, as a clean energy, is prepared mainly through a reforming reaction of hydrocarbons such as natural gas, LPG, naphtha and gasoline. Although hydrogen may also be manufactured by gasification or electrolysis of fossil fuel and biomass, the aforementioned reforming method using fossil fuel appears more economical for several decades to come.

Examples of the reforming methods using fossil fuel include steam reforming, partial oxidation, autothermal reforming or partial oxidation reforming methods, and the currently commercialized steam reforming method is most appropriate for mass production of hydrogen. Thus, many researches have been performed to develop a novel catalyst and a method to improve a steam reforming reaction for stably obtaining a hydrogen-rich gas with high yield through the steam reforming reaction of hydrocarbons.

Carbon deposition on the reforming catalyst during the reforming reaction of hydrocarbons has been known as a major cause of the deactivation of catalyst. Because the amount of the carbon deposition may be thermodynamically calculated from the hydrogen-carbon molar ratio and the oxygen-carbon molar ratio in reactants, an excess amount of steam was conventionally used in the steam reforming reaction of methane to inhibit the deactivation of catalyst due to the carbon deposition. Generally, when the steam reforming reaction is performed in an increased hydrogen-oxygen molar ratio, a gas with a 3:1 or higher hydrogen-carbon monoxide molar ratio may be produced because the water gas shift reaction is promoted during the reforming reaction. For this reason, the steam reforming reaction of hydrocarbons appears suitable for production of a hydrogen-rich gas. The steam reforming reaction of methane, currently in an industrial use, is preformed under the conditions of 730-860° C., 20-40 atm and steam-methane molar ratio of 4-6:1.

In the meantime, a nickel-based catalyst is generally used during the aforementioned steam reforming reaction. A high-performance reforming catalyst, with superior property to that of the conventional steam reforming catalyst, should have superior resistance to the carbon deposition, thermal stability and mechanical stability as well as excellent catalytic activity. To meet these needs, it is important to select an appropriate support with high specific surface area, and mechanical and thermal stabilities, such as an alumina support.

$Ni/Al_2O_3$ has been reported as a conventional catalyst for steam reforming reaction of methane catalyst [Numaguchi, T., Ind. Eng. Chem. Res., 30, 447-453, 1991], and $TiO_2/MgO$ and Pt—$Re/Al_2O_3$ are reported as a catalyst for reforming naphtha [Teresita, F. G. and Carlos, R. A., Ind. Eng. Chem. Res., 31, 1283-1288, 1992]. The aforementioned catalysts have been reported to have a problem of quick deactivation due to carbon deposition.

Moreover, the zirconia-supported nickel catalyst prepared by adding cobalt to nickel is disclosed as a catalyst for steam reforming reaction of hydrocarbons [U.S. Pat. No. 4,026,823 (1975)], and a catalyst prepared by impregnating nickel catalyst added with an appropriate amount of a promoter such as lanthanum, cerium and silver onto a general support such as alumina, silica, magnesia and zirconia is also disclosed [U.S. Pat. No. 4,060,498]. There is a catalyst for steam reforming reaction of hydrocarbons prepared by impregnating iridium onto a complex support mixed with zirconia and alumina [U.S. Pat. No. 4,297,205 (1980) and U.S. Pat. No. 4,240,934 (1978)]. However, these catalysts have problems that they have low activity or become deactivated when applied to a steam reforming reaction at high space velocity, and thus it is necessary to improve the support or disperse the active metal highly uniformly to secure the catalytic activity and thermal stability at high temperature and maintaining the activity at high space velocity.

Besides, there are disclosed a catalyst for reforming multi-component hydrocarbons prepared by producing a support adding a small amount of manganese oxide and cerium oxide to an alumina support, followed by mixing a noble metal such as Pt, Pd, Rh and Ir, a transition metal such as Ni and Co and an alkaline earth metal such as Ca and Mg in an appropriate molar ratio, along with a method of reforming hydrocarbons [WO 2002/38268, WO 2002/78840]. However, this method also has the following problems that the production of catalyst is very difficult and time-consuming due to the multi-component system of the catalyst, production cost is high because of the use of a noble metal as an active metal, and that the catalytic activity decreases at high temperature and high space velocity. Therefore, to apply this catalyst to the steam reforming reaction and produce a hydrogen-rich gas at low cost, it is necessary to simplify the process for producing a multi-component catalyst, reduce the usage of the noble metal, and improve the catalyst so that its activity may not be deteriorated even at high temperature and high space velocity.

There is also disclosed a process of preparing a catalyst using hydrotalcite precursor and a use of this catalyst in the oxidation of methane and the reforming reaction of methanol [U.S. Pat. Nos. 5,354,932 and 6,071,433]. This catalyst was applied to the reaction performed at 300° C. or a lower temperature considering the layered structure of the metal oxide catalyst collapsed at 300-400° C. or a higher temperature. Therefore, to perform a reforming reaction of hydrocarbons using a catalyst at 300° C. or a higher temperature, it is important to select an appropriate metal that may form a new structure and maintain a catalytic activity after the layered structure collapses.

Japanese patent publication no. 11-276893 discloses that carbon dioxide reforming reaction of methane was performed wherein a metal oxide catalyst was prepared using a precursor of hydrotalcite containing a noble metal (Rh, Pd, Ru) and a transition metal (Ni) as active. However, despite the use of expensive noble metals, the catalyst showed 90% or higher conversion of methane only at 800° C., and the conversion abruptly decreased at a lower temperature. At 600° C., all the test catalysts showed 30% or lower conversion of methane except the catalyst containing 5 wt % of Rh showed about 50% of conversion.

Therefore, for preparing a metal oxide catalyst using hydrotalcite as a precursor and applying the catalyst in the reforming reaction of hydrocarbons, it is important to lower the production cost by using a transition metal instead of a noble metal, to optimize the contents of components in the catalyst to maximize the catalytic activity, and to select a reaction system where the catalyst may show a relatively high activity even at low temperature.

Moreover, although many references have disclosed methods of manufacturing a catalyst using hydrotalcite precursor in the reforming reaction of hydrocarbons such as methane and methanol, there has been no reference on catalysts used in LPG (liquefied petroleum gases), mixed with hydrocarbon compounds, particularly in the steam reforming reaction of LPG.

Therefore, the present inventors have made efforts to develop a highly efficient catalyst in order to solve the aforementioned problems for the deactivation of catalyst due to the carbon deposition during the reforming reaction of hydrocarbons and the production cost due to the use of expensive active metal. As a result, a nickel-based catalyst with highly dispersed nickel and higher specific surface area than that of the conventional catalyst may be manufactured by preparing a hydrotalcite-like catalyst precursor consisting of nickel, aluminum and magnesium cations, and uniformly dispersing nickel on the surface and the inner part of the hydrotalcite-like support through the substitution between nickel and magnesium, while simultaneously optimizing the molar ratios of the metal component. Further, the present invention may be accomplished by finding that hydrogen may be obtained in high yield using the catalyst in the steam reforming reaction of LPG and that the catalytic activity may be maintained for a longer period of time than that of the commercially available catalyst (ICI company) for the steam reforming reaction of methane due to the minimization of carbon deposition.

Therefore, the present invention aims to provide a nickel catalyst with a highly dispersed active metal on the inner part and the surface of the support prepared using a hydrotalcite-like precursor, and the steam reforming reaction of LPG using the aforementioned catalyst.

DETAILED DESCRIPTION OF INVENTION

Figure 1:
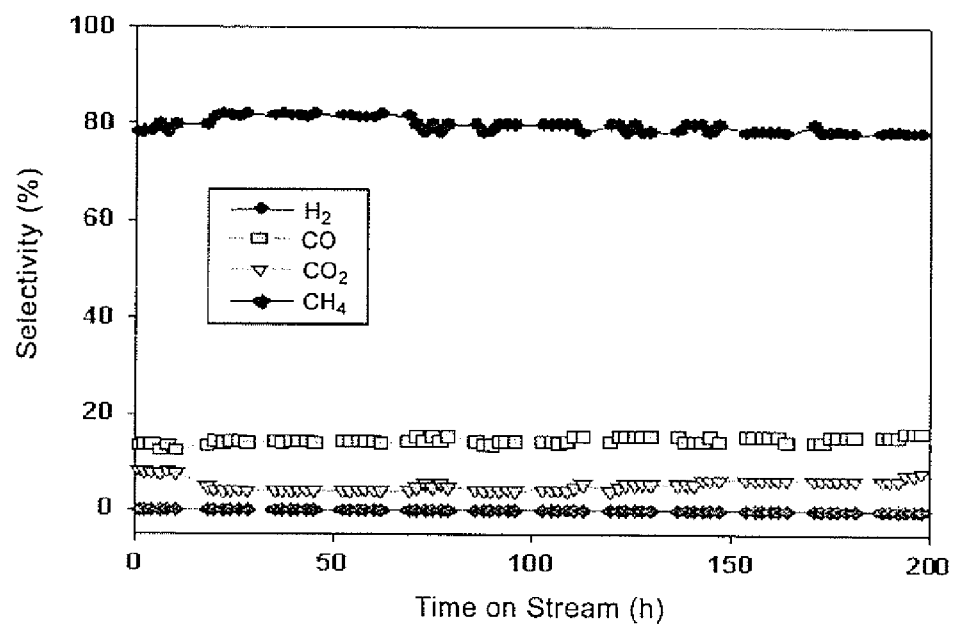
FIG. 1 is a result of evaluating the stability for steam reforming of LPG over catalyst prepared in Preparatory Example 1 as a function of time at 800° C.

The present invention relates to a nickel-based catalyst for steam reforming reaction of LPG prepared using a hydrotalcite-like precursor of Formula (I):

$$Ni_x/Mg_yAl \qquad (I)$$

wherein x and y are molar ratios of Ni and Mg, respectively, relative to Al; x is 0.25-1; y is 0.6-5.5; and x/y is 0.15-0.45.

Moreover, the present invention relates to a process for steam reforming of LPG, which comprises the step of producing a hydrogen-rich gas by performing steam reforming of LPG in the presence of a nickel-based catalyst of Formula (I) above at a temperature of 700-950° C., a space velocity of 2,500-250,000 $h^{-1}$ and steam to carbon ratio of 1-4 to 1, thereby producing a hydrogen-rich gas.

Hereunder is provided a detailed description of the present invention.

The present invention relates to a nickel-based catalyst prepared by optimizing the mixing ratio of nickel, aluminum and magnesium and using hydrotalcite-like precursor, where nickel is uniformly dispersed onto the inner part and the surface through the substitution reaction between nickel and magnesium.

The nickel-based catalyst prepared according to the conventional method has a serious problem of the deactivation of a catalyst due to the carbon deposition, and is known to cause various types of carbon deposition during the steam reforming reaction of hydrocarbons. In particular, the whisker carbon deposition usually occurs mainly at the nickel crystalline region during the steam reforming reaction. When hydrocarbons adsorbed on the metal surface are dissociated, carbon atoms are produced, and then the carbon atoms are dissolved in metal and dispersed into particles, thereby forming a fiber-shaped growth nucleus behind interface. Thus formed whisker carbon deposition causes the catalyst to be easily broken due to high mechanical strength and lowers pressure.

Recently, hydrotalcite, an anionic clay, has drawn much attention as a precursor for producing catalyst because it causes the catalyst to have a higher surface area, thermal stability and lower crystal size after sintering, and there has been an attempt to prepare a nickel-based catalyst using the hydrotalcite as a precursor and to use the catalyst in steam reforming reaction of methane [Applied chemistry, 4(2), 2000].

However, the nickel-based catalyst prepared using hydrotalcite-like precursor according to the present invention is a novel catalyst where the concept of hydrotalcite is introduced, which is characterized in that the active nickel metal is uniformly dispersed onto the surface and the inner part of the catalyst through the substitution reaction of a divalent nickel and magnesium using nickel and magnesium as a divalent metal and aluminum as a trivalent metal, and that the molar ratio of these metals are optimized to improve the specific surface area of catalyst and the surface area of active nickel. That is, after high temperature sintering, the specific surface area of catalyst and the surface area of nickel are increased up to 100-300 $m^2/g$ and 10-30 $m^2/g$, respectively, thereby maximizing catalytic effect for the steam reforming of LPG.

Moreover, the aforementioned reactions appear similar to each other in that the steam reforming reaction of methane or LPG is steam reforming of hydrocarbons. However, they are definitely different in reaction conditions such as a catalyst, a reaction temperature and a reaction pressure due to the difference of reactants, i.e. methane and LPG. This fact has been ascertained herein by performing steam reforming reactions of LPG on a commercially available catalyst (ICI company) for steam reforming reaction of methane and a reforming catalyst prepared for steam reforming reaction of LPG according to the present invention, respectively, at a temperature of 800° C. for 200 hours and observing totally different results between the two reactions. For example, methane is the most stable compound among hydrocarbons and requires a relatively higher temperature (above about 800° C.) or higher pressure (above about 20 bars) for conversion of 85% or higher as compared to those of other hydrocarbons. Moreover, it is known that, for increasing the conversion of methane up to 90%, the steam-carbon molar ratio should be higher than 4 or a noble metal should be added as an active metal. However, any of these is not preferable considering the increase of the manufacturing cost of catalyst. On the contrary, when the reforming reaction of LPG is subjected to at the same temperature range, methane, ethylene and propylene, which are produced during the initial decomposition reaction, show a very fast decomposition rate and promote the decomposition reaction of LPG as the reaction proceeds. As a result, the conversion of LPG may be maintained at 100% even at a lower temperature (about 600° C.) than that in the steam reforming reaction of methane. Moreover, even at a steam-carbon molar ratio of below 3, 100% conversion of LPG may be obtained without applying an additional pressure.

In order to obtain a high reaction activity during the steam reforming reaction of LPG at a low temperature and a low steam-carbon molar ratio, it is important to disperse an active metal onto a support with superior mechanical property and thermal stability and high surface area so that a predetermined range of specific surface area of a catalyst and surface area of an active metal may be secured and carbon deposition may be inhibited. The amount of the active metal in the catalyst serves as an important variable.

Thus, a nickel-based catalyst for steam reforming reaction of LPG, where 10-24 wt % active nickel is impregnated on support relative to the total amount of catalyst, is developed in the present invention by using hydrotalcite-like precursor. If the nickel content is above 24 wt %, nickel particles are large enough to promote the formation of whisker carbon deposition and cause the deactivation of catalyst. If the nickel is below 10 wt %, the number of active sites for steam reforming reaction of hydrocarbons is decreased and the catalytic activity is lowered due to a low nickel content.

Moreover, the nickel-based catalyst herein forms 100-300 m²/g of specific surface area. The nickel-based catalyst having the aforementioned BET surface area may be formed to balance the valance with the formation of holes in the structure during the formation of brucite-type layer by a divalent metal ion ($M^{2+}$) and a trivalent metal ion ($M^{3+}$) when hydrotalcite structure having a formula of $[(M^{2+})_{1-x}(M^{3+})_x (OH^-)_2]^{x+}[(A^{n-})_{x/n}] \cdot mH_2O$ is formed. The hydrotalcite-like precursor may be formulated into the formula of $[(Ni^{2+})_x (Mg^{2+})_y(Al^{3+})(OH^-)_2]^{1-x/y}[(CO_3^{2-})_{(x/y)/n}] \cdot mH_2O$, where x and y are molar ratios of Ni and Mg relative to Al, respectively; x is 0.25-1; y is 0.6-5.5; x/y is 0.15-0.45; and m is the number of hydrated water molecules.

When the specific surface area is below 100 m²/g, the dispersed nickel active metal particle are large enough to form carbon deposition on the surface of catalyst, thus causing the deactivation of catalyst due to the carbon deposition. On the contrary, when the specific surface is above 300 m²/g, there is limitation in preparing the hydrotalcite-like catalyst despite the advantages of superior conversion of LPG and high yield of hydrogen. Besides the specific surface area of a catalyst, the specific surface area of the active metal, nickel, is maintained at the range of 10-30 m²/g. That is, the present invention optimizes the specific surface area of the active metal by optimizing the amount of the other ingredients, while minimizing the amount of nickel.

Hereunder is provided a detailed description of nickel-based catalyst prepared using hydrotalcite-like precursor according to the present invention.

First of all, although examples of the hydrotalcite-like precursor herein include without limitation nitrate, acetonate, acetate and acetacetonate, the precursor used in the present invention is prepared by adding an aluminum nitrate aqueous solution and a magnesium nitrate aqueous solution in a sodium carbonate aqueous solution and mixing this solution at room temperature for 30-60 minutes.

The precursors of the aforementioned nickel, magnesium and aluminum are used in an optimized molar ratio as shown in Formula (I). The molar ratio of Ni to Al, x, is 0.25-1. If x is below 0.25, the activity of a catalyst may be lowered because the nickel content in the catalyst becomes lower than 10 wt % and active sites for the reaction decrease. On the contrary, if x is above 1, the nickel contents in catalyst exceeds 24 wt % and the nickel particle may be large enough to form whisker carbon, which may cause the deactivation of catalyst due to carbon deposition during the steam reforming reaction of LPG. The molar ratio of Mg to Al, y, is 0.6-5.5. If y is below 0.6, comparatively less magnesium may be replaced with nickel, thus decreasing the amount of the active metal in the catalyst and lowering the catalytic activity. On the contrary, if x exceeds 5.5, the specific surface area of the hydrotalcite-like precursor decreases and the catalytic activity may be lowered. Moreover, the value of x/y is 0.15-0.45. If x/y is below 0.15, hydrotalcite-like precursor may not completely formed and there may be present materials in the form of $Mg(OH)_2$, thus decreasing the specific area of catalyst. On the contrary, if x/y exceeds 0.45, an excess amount of nickel may be added and particle may grow during the sintering process, thereby decreasing the surface area of nickel.

Moreover, the sodium carbonate serves as an anion for forming the hydrotalcite-like structure by stabilizing the brucite-type layers that divalent magnesium ion ($Mg^{2+}$) and trivalent aluminum ion ($Al^{3+}$) form with hydroxyl anion ($OH^-$), and it is used so that 1-2 moles of sodium may be used relative to one mole of aluminum.

Then, the mixture is vigorously mixed at room temperature for 30-60 minutes, added with 5M sodium hydroxide aqueous solution and adjusted to pH 10 to generate a solid precipitation. This solid is aged at 60-80° C. for 12-18 hours to replace magnesium with nickel.

The products are filtered and washed with distilled water until hydroxide ion may not be found. The filtered precipitates are dried in a drying oven at 80-90° C. for 1-2 hours, and sintered in a sintering furnace in an air condition at 700-900° C. for 5 hours, thus preparing the nickel-based catalyst for steam reforming reaction of LPG.

Moreover, the present invention is also characterized in that thus prepared nickel-based catalyst may be used in a steam reforming reaction of LPG to manufacture hydrogen with high yield for a long period of time without deactivation of the catalytic activity. The steam reforming reaction of LPG is a target of study because it may be applied to a hydrogen station for a fuel cell powdered vehicle or a fuel processor for a fuel cell or petroleum chemical process.

Although the steam reforming reaction of LPG herein includes without limitation any one that is used in a technical field the present invention pertains to, Examples herein of the present invention employed in a laboratory-manufactured conventional tubular catalyst reactor. As a pretreatment, the nickel-based catalyst is subjected to a sieving through a 80-100 mesh sieves, to provide 150-250 μm particles. A suitable amount of the catalyst sieved is charged in the reactor, and reduction is performed with hydrogen at 750° C. for 2-4 hours before the reaction.

Then, steam and LPG are introduced into the reactor as reactants so that the steam-carbon in LPG molar ratio may be 1-4:1, preferably 2-3:1. When the molar ratio is below 1, carbon generation reaction is dominant. On the contrary, the energy cost may increase while carbon generation may be inhibited when the molar ratio is above 4. As the LPG, propane or butane or a mixture thereof may be used in the present invention. When the mixture is used as the LPG, it is preferable to use 10-40 vol % of propane and 60-90 vol % of butane. The contents of LPG for vehicle, currently available in Korea, normally falls into the aforementioned range although it varies depending the atmospheric temperature, e.g. summer and winter.

The temperature of the reactor is controlled to 600-850° C. by an electrical heater and a PID proportional integral derivative temperature programmable controller. Under an atmospheric pressure, the gas is introduced into the reactor by controlling the space velocity to 2,500-250,000 $h^{-1}$ with a mass flow controller, thus performing a reaction and producing a hydrogen-rich gas continuously. The gaseous compositions before and after the reaction are analyzed by an on-line gas chromatography, and a carbosphere column is used for gas separation.

To evaluate the high-temperature activity and the thermal stability of thus-prepared reforming catalysts according to the present invention, the catalytic activity was measured at the reaction temperature of 800° C. as a function of time. The change of steam-carbon molar ratio and the effect of the variance of gas space velocity on the product distribution were also measured. As a result, the nickel-based reforming catalyst according to the present invention was ascertained to have higher activity in the process of producing hydrogen from propane than the commercially available catalyst for steam reforming reaction of methane (ICI company, United Kingdom).

Moreover, the present invention improves the catalytic activity to maintain high activity at high space velocity, thus suggesting the possibility that the catalyst according to the present invention may be used as a commercial catalyst. In particular, as compared to the commercially available catalyst for steam reforming reaction of $CH_4$ (ICI company, United Kingdom), the process of the present invention described herein has advantages that the durability has been much improved and the steam reforming reaction may be performed at relatively lower steam-carbon in LPG molar ratio.

EXAMPLES

The present invention is described more specifically by the following Examples. Examples herein are only meant to illustrate the present invention but they should not be construed as limiting the scope of the claimed invention.

Preparatory Example 1

5 g of $Al(NO_3)_2 \cdot 9H_2O$, 9.49 g of $Mg(NO_3)_2 \cdot 6H_2O$ and 0.63 g of $Na_2CO_3$ were dissolved in 15 mL of distilled water, respectively. Thus obtained $Al(NO_3)_2$ aqueous solution and the $Mg(NO_3)_2$ aqueous solution were added dropwise into the $Na_2CO_3$ aqueous solution, and the mixed solution was stirred for 30 minutes. 0.89 g of $Ni(NO_3)_2 \cdot 6H_2O$ was dissolved in 15 mL of distilled water, and this aqueous solution was added dropwisely in the aforementioned mixed solution, and stirred for 30 minutes. 5 M NaOH aqueous solution was added dropwisely until pH value reached 10 to cause precipitation, and the mixed solution was vigorously stirred for 30 minutes. The precipitated product was placed at 60° C. for 12 hours to develop an improved hydrotalcite-like structure, washed with distilled water until hydroxide ion was not detected, and dried at 80° C. for one hour.

Thus obtained hydrotalcite-like precursor was calcined at 850° C. for 5 hours in air, thus preparing nickel-based catalyst using hydrotalcite-like precursor where an active ingredient, nickel metal is highly dispersed on both the surface and the inner space of the hydrotalcite-like support.

Thus prepared catalyst was ascertained to have $Ni_{0.5}/Mg_{2.5}Al$ of content and 197.7 $m^2/g$ of specific surface area. The surface area of the active ingredient, Ni, was 13.68 $m^2/g$, and the measurement by using an inductively coupled plasma-mass spectrometer (ICP/MS) showed that the content of nickel was 20 wt % in the catalyst.

Preparatory Example 2

Nickel-based catalysts were prepared by following the same procedure as in Preparatory Example 1 except that the amounts of $Mg(NO_3)_2 \cdot 6H_2O$ and $Ni(NO_3)_2 \cdot 6H_2O$ were varied as presented in TABLE 1 while the amount of $Al(NO_3)_2 \cdot 9H_2O$ was fixed to 5 g as in Preparatory Example 1.

Nickel contents and specific surface areas along with surface areas of the active metal of the catalysts prepared in Preparatory Examples 1-2 are also provided in TABLE 1.

TABLE 1

|   | $Mg(NO_3)_2 \cdot 6H_2O$ (g) | $Al(NO_3)_2 \cdot 9H_2O$ (g) | $Ni(NO_3)_2 \cdot 6H_2O$ (g) | Catalyst | Ni content (wt %)[a] | Specific surface area $(m^2/g)$[b] | Surface area of active metal $(m^2/g)$[c] |
|---|---|---|---|---|---|---|---|
| 1 | 9.49 | 5 | 0.89 | $Ni_{0.50}/Mg_{2.50}Al$ | 20.0 | 197.7 | 13.68 |
| 2-1 | 12.84 | 5 | 1.11 | $Ni_{0.62}/Mg_{3.38}Al$ | 16.3 | 190.3 | 13.02 |
| 2-2 | 16.22 | 5 | 1.3 | $Ni_{0.73}/Mg_{4.27}Al$ | 16.8 | 188.5 | 12.31 |
| 2-3 | 19.56 | 5 | 1.51 | $Ni_{0.85}/Mg_{5.15}Al$ | 16.4 | 186.4 | 12.15 |
| 2-4 | 6.15 | 5 | 0.68 | $Ni_{0.38}/Mg_{1.62}Al$ | 16.1 | 184.2 | 12.07 |
| 2-5 | 2.81 | 5 | 0.46 | $Ni_{0.26}/Mg_{0.74}Al$ | 15.7 | 171.1 | 11.54 |

[a] Ni contents measured using ICP/MS
[b] BET surface area measured using Autosorb-1 (Quantachrome)
[c] Surface area of active metal measured using Autochem-II (Micromeritrics)

Preparatory Example 3

Nickel-based catalysts were prepared by following the same procedure as in Preparatory Example 1 except that the amounts of Al(NO$_3$)$_2$.9H$_2$O and Ni(NO$_3$)$_2$.6H$_2$O were varied as presented in TABLE 2 while the amount of Mg(NO$_3$)$_2$.6H$_2$O was fixed.

TABLE 2

| | Mg(NO$_3$)$_2$•6H$_2$O (g) | Al(NO$_3$)$_2$•9H$_2$O (g) | Ni(NO$_3$)$_2$•6H$_2$O (g) | Catalyst | Ni content (wt %)$^a$ | Specific surface area (m$^2$/g)$^b$ | Surface area of active metal (m$^2$/g)$^c$ |
|---|---|---|---|---|---|---|---|
| 3-1 | 1 | 0.53 | 0.10 | Ni$_{0.20}$/MgAl$_{0.40}$ | 20.0 | 197.7 | 13.68 |
| 3-2 | 1 | 0.39 | 0.09 | Ni$_{0.18}$/MgAl$_{0.29}$ | 16.3 | 190.3 | 13.02 |
| 3-3 | 1 | 0.31 | 0.08 | Ni$_{0.17}$/MgAl$_{0.23}$ | 16.8 | 188.5 | 12.31 |
| 3-4 | 1 | 0.26 | 0.07 | Ni$_{0.16}$/MgAl$_{0.19}$ | 16.4 | 186.4 | 12.15 |
| 3-5 | 1 | 0.81 | 0.11 | Ni$_{0.23}$/MgAl$_{0.62}$ | 16.1 | 184.2 | 12.07 |
| 3-6 | 1 | 1.78 | 0.16 | Ni$_{0.35}$/MgAl$_{1.35}$ | 15.7 | 171.1 | 11.54 |

$^a$Ni contents measured using ICP/MS
$^b$BET surface area measured using Autosorb-1 (Quantachrome)
$^c$Surface area of active metal measured using Autochem-II (Micromeritrics)

Preparatory Example 4

Nickel-based catalysts were prepared by following the same procedure as in Preparatory Example 1 except that the amounts of Mg(NO$_3$)$_2$.6H$_2$O and Al(NO$_3$)$_2$.9H$_2$O were varied as presented in TABLE 3 while the amount of Ni(NO$_3$)$_2$.6H$_2$O was fixed.

TABLE 3

| | Mg(NO$_3$)$_2$•6H$_2$O (g) | Al(NO$_3$)$_2$•9H$_2$O (g) | Ni(NO$_3$)$_2$•6H$_2$O (g) | Catalyst | Ni content (wt %)$^a$ | Specific surface area (m$^2$/g)$^b$ | Surface area of active metal (m$^2$/g)$^c$ |
|---|---|---|---|---|---|---|---|
| 4-1 | 10.66 | 5.62 | 1 | Ni/Mg$_{5.00}$Al$_{2.00}$ | 20.0 | 197.7 | 13.68 |
| 4-2 | 11.57 | 4.50 | 1 | Ni/Mg$_{5.45}$Al$_{1.61}$ | 16.3 | 190.3 | 13.02 |
| 4-3 | 12.48 | 3.85 | 1 | Ni/Mg$_{5.85}$Al$_{1.37}$ | 16.8 | 188.5 | 12.31 |
| 4-4 | 12.95 | 3.31 | 1 | Ni/Mg$_{6.06}$Al$_{1.18}$ | 16.4 | 186.4 | 12.15 |
| 4-5 | 9.04 | 7.35 | 1 | Ni/Mg$_{4.26}$Al$_{2.63}$ | 16.1 | 184.2 | 12.07 |
| 4-6 | 6.11 | 10.87 | 1 | Ni/Mg$_{2.85}$Al$_{3.85}$ | 15.7 | 171.1 | 11.54 |

$^a$Ni contents measured using ICP/MS
$^b$BET surface area measured using Autosorb-1 (Quantachrome)
$^c$Surface area of active metal measured using Autochem-II (Micromeritrics)

Comparative Preparatory Example 1

The γ-Al$_2$O$_3$ supported nickel catalysts were prepared according to an impregnation method.

8.7 g of γ-Al$_2$O$_3$ powder was added in a beaker containing 50 mL of distilled water, and stirred until the mixture turns into a slurry. The solution prepared by dissolving 6.5 g of Ni(NO$_3$)$_2$.6H$_2$O in 15 mL of distilled water was added in the γ-Al$_2$O$_3$ slurry, and stirred at room temperature for 10 hours. This slurry was stirred at 80° C. to evaporate water, and the resultant powder was dried in an oven at 100° C. for 12 hours and calcined using a calcining furnace in air at 800° C. for 2 hours, to produce 12 wt % Ni/γ-Al$_2$O$_3$ catalyst. Thus produced catalyst was ascertained to have a specific surface area of 91.3 m$^2$/g, and a surface area of Ni was 7.46 m$^2$/g.

Comparative Preparatory Example 2

The MgO supported nickel catalysts were prepared according to an impregnation method.

12 wt % Ni/MgO catalyst was prepared by following the same procedure as in Comparative Preparatory Example 1 except that MgO was used as a support instead of γ-Al$_2$O$_3$.

The specific surface area of the catalyst was 39.0 m$^2$/g, and the surface area of active Ni was 3.62 m$^2$/g.

As shown in Tables 1-3, Preparatory Examples 1-6 using a hydrotalcite-like support were higher in the specific surface area of catalyst and the surface area of active nickel than those of Comparative Preparatory Examples 1-2 where nickel was supported on alumina or magnesium oxide according to an impregnation method. The higher surface area of active nickel in the present invention appears to be due to uniform distribution of the active nickel onto the hydrotalcite-like support.

Comparative Preparatory Examples 3-6

Nickel-based catalysts were prepared with hydrotalcite-like precursor by following the same procedure as in Preparatory Example 1 except varying the amounts of Al(NO$_3$)$_2$.9H$_2$O, Mg(NO$_3$)$_2$.6H$_2$O and Ni(NO$_3$)$_2$.6H$_2$O.

Nickel contents and specific surface areas along with surface areas of active metal of the catalysts prepared in Comparative Preparatory Examples 1-6 are provided in TABLE 4.

TABLE 4

| catalyst | Ni content (wt %)[a] | Specific surface area ($m^2/g$)[b] | Surface area of active metal ($m^2/g$)[c] |
|---|---|---|---|
| Comp. Prep. Ex. 1 | Ni/γ-$Al_2O_3$ | 12.96 | 91.3 | 7.46 |
| Comp. Prep. Ex. 2 | Ni/MgO | 11.96 | 39.0 | 3.62 |
| Comp. Prep. Ex. 3 | $Ni_{1.84}/Mg_{3.00}Al$ | 30.1 | 95.4 | 7.79 |
| Comp. Prep. Ex. 4 | $Ni_{1.53}/Mg_{3.00}Al$ | 25.2 | 89.2 | 7.28 |
| Comp. Prep. Ex. 5 | $Ni_{0.38}/Mg_{3.38}Al$ | 10.4 | 54.0 | 4.41 |
| Comp. Prep. Ex. 6 | $Ni_{0.19}/Mg_{3.38}Al$ | 5.1 | 51.8 | 4.23 |

[a]Ni contents measured using ICP/MS
[b]BET surface area measured using Autosorb-1 (Quantachrome)
[c]Surface area of active metal measured using Autochem-II (Micromeritrics)

As shown in Table 4, specific surface area of the catalyst and surface area of active nickel were remarkably lowered in Comparative Preparatory Examples 1-2 where active nickel was supported on conventional alumina and magnesium supports and Comparative Preparatory Examples 3-6 where the nickel contents were out of range herein than Preparatory Examples 1-6 according to the present invention.

In Comparative Preparatory Examples 1-2, the lowering in surface area of active nickel appears to be due to the fact that the support does not form a hydrotalcite-like structure and nickel is distributed mainly on the surface of the support, which promotes the sintering of the active metal.

Moreover, in Comparative Preparatory Examples 3-4, the excess content of nickel (25 wt % or higher) appears to increase the amount of nickel exposed on the surface of the hydrotalcite-like support than that present in the inner part of the support, thus promoting the sintering of nickel, increasing the particle size of nickel and decreasing the dispersion degree of active nickel, which ultimately results in lower specific surface area of catalysts and surface area of active nickel than those in Preparatory Examples 1-6 according to the present invention. In Comparative Preparatory Example 5-6, it was ascertained that less than 10 wt % of a nickel content remarkably reduces the specific surface area due to a relatively larger amount of magnesium.

Therefore, it was ascertained that the specific surface area of the catalyst and the surface area of active nickel may be remarkably improved by optimizing the molar ratios of nickel, magnesium and aluminum and controlling the nickel contents to a predetermined range in forming a hydrotalcite-like structure according to the present invention.

Example 1

To measure the catalytic activity, a laboratory-manufactured conventional atmospheric fixed-bed catalyst reactor was charged with catalyst having a particle size of 150-250 μm, which was prepared by sieving $Ni_{0.5}/Mg_{2.5}Al$ catalysts obtained in Preparatory Example 1 with 80-100 mesh sieves. Before the reaction, the catalyst was subjected to reduction with 99.999% hydrogen gas at 750° C. for 2-4 hours.

As reactants, steam and propane were introduced into the reactor so that the molar ratio of steam to carbon in the propane gas may be 3 to 1. The temperature of the reactor was maintained 600-850° C. using an electrical heater and a PID temperature controller. The space velocity was controlled to 10,000 $h^{-1}$ based on only the propane and steam by a mass flow rate controller, thus performing a reaction continuously to produce hydrogen gas.

LPG conversion was maintained at 100%, and the catalytic activity was identified from the selectivity of products. Products were analyzed using an on-line gas chromatography with carbosphere column. Hydrogen, carbon monoxide, methane and carbon dioxide were observed as product gases at temperatures of 600, 650, 700, 750, 800 and 850° C., respectively. The selectivity of hydrogen at each temperature above was observed to be 65.5, 68.7, 70.4, 73.2, 77.8 and 77.9%, respectively. TABLE 5 shows the contents of product gas after the reaction at 800° C. for 3 hours.

Analysis using a gas chromatography with a gas chromatography mass spectrometer showed that $C_2$-$C_3$ side products were not detected, which may be produced by thermal decomposition of propane, while a small amount of $C_1$ compound was only observed under a condition according to the present invention. The selectivity of hydrogen at each temperature is presented in TABLE 6.

TABLE 5

| Reaction temperature (° C.) | Contents (%) of product gas after steam reforming reaction of LPG | | | |
|---|---|---|---|---|
| | Hydrogen | Carbon monoxide | Methane | Carbon dioxide |
| 800 | 77.8 | 16.3 | 0 | 5.9 |

Examples 2-6

Steam reforming reaction of propane was performed same as in Example 1 except using catalysts prepared in Preparatory Example 2 instead of those prepared in Preparatory Example 1. The selectivity of hydrogen at each temperature is provided in TABLE 6.

Example 7

Steam reforming reaction of propane was performed same as in Example 1 except using butane instead of propane as a reactant. The selectivity of hydrogen at each temperature is provided in TABLE 6.

Example 8

Steam reforming reaction of propane was performed same as in Example 1 except using 30:70 mixture of propane and butane instead of propane as a reactant. The selectivity of hydrogen at each temperature is provided in TABLE 6.

TABLE 6

| Reaction gas | Catalyst | \multicolumn{6}{c}{Effect of temperature (° C.) on hydrogen selectivity (%)} | | | | | |
| --- | --- | --- | --- | --- | --- | --- | --- |
| | | 600 | 650 | 700 | 750 | 800 | 850 |
| Ex. 1 Propane | $Ni_{0.50}/Mg_{2.50}Al$ | 65.5 | 68.7 | 70.4 | 73.2 | 77.8 | 77.9 |
| Ex. 2 Propane | $Ni_{0.62}/Mg_{3.38}Al$ | 65.2 | 68.6 | 70.8 | 72.1 | 76.9 | 77.1 |
| Ex. 3 Propane | $Ni_{0.73}/Mg_{4.27}Al$ | 64.9 | 67.9 | 70.2 | 71.9 | 75.7 | 76.3 |
| Ex. 4 Propane | $Ni_{0.85}/Mg_{5.15}Al$ | 64.6 | 67.8 | 69.5 | 70.3 | 72.6 | 74.1 |
| Ex. 5 Propane | $Ni_{0.38}/Mg_{1.62}Al$ | 64.5 | 67.8 | 68.9 | 70.1 | 71.9 | 72.1 |
| Ex. 6 Propane | $Ni_{0.26}/Mg_{0.74}Al$ | 63.9 | 66.3 | 68.6 | 69.4 | 70.2 | 71.7 |
| Ex. 7 Butane | $Ni_{0.50}/Mg_{2.50}Al$ | 64.3 | 67.5 | 69.4 | 70.8 | 74.7 | 76.2 |
| Ex. 8 Propane:butane = 30:70 | $Ni_{0.50}/Mg_{2.50}Al$ | 67.3 | 67.3 | 67.9 | 68.7 | 69.5 | 70.2 |

As shown in TABLE 6, it was ascertained that the hydrogen selectivity increases with the increase of reaction temperature from 600° C. to 850° C. when steam reforming reaction of propane was performed on nickel-based catalysts prepared in Preparatory Examples 1-2 using hydrotalcite-like precursor as a support. In particular, the hydrogen selectivity was observed to be higher than 70% at 700° C. in Examples 1-3 where steam reforming reaction of propane was performed on catalysts with a relatively higher specific surface area of the catalyst and surface area of active nickel.

Moreover, when steam reforming reaction of a 30:70 mixture of propane and butane was performed on a catalyst with highest surface area and best activity prepared in Preparatory Example 1, the highest hydrogen selectivity was observed to be 70.2% and there was no major change in the hydrogen selectivity at all temperatures tested. In the steam reforming reaction of a 30:70 mixture of propane and butane, 100% conversion of reactants was obtained.

Considering the aforementioned results, it may be concluded that an active nickel may be distributed in a highly uniform state on an improved hydrotalcite support consisting of a predetermined molar ratio of Mg and $Al_2O_3$, which may inhibit the sintering of active nickel; the conversion of reactant gas may be maintained to 100% and carbon deposition may be inhibited under the steam reforming reaction condition of the present invention due to high specific surface area and surface area of active nickel; and high hydrogen selectivity may be obtained at 700° C. or higher even when a mixture is used as reactant gas.

Meanwhile, it was also ascertained that the reaction temperature of above 850° C. is not economically preferred because much energy is required to maintain the temperature. The temperature of below 600° C. was not preferred either because the hydrogen selectivity was lowered below 65% or the carbon deposition occurred was too serious.

Example 9

Steam reforming reaction of propane was performed same as in Example 1 except using a catalyst prepared in Preparatory Example 1. Effect on the hydrogen selectivity was observed when the steam to carbon ratio was varied as 1-4:1 at 800° C., and the results were provided in TABLE 7.

Example 10

Steam reforming reaction of propane was performed same as in Example 8 except using a catalyst prepared in Preparatory Example 2-2, and the results were provided in TABLE 7.

TABLE 7

| Catalyst | \multicolumn{6}{c}{Effect of steam-carbon ratio on hydrogen selectivity (%)} | | | | | |
| --- | --- | --- | --- | --- | --- | --- |
| | 1:1 | 1.5:1 | 2:1 | 2.5:1 | 3:1 | 3.5:1 |
| Ex. 9 $Ni_{0.50}/Mg_{2.50}Al$ | 62.5 | 70.7 | 72.9 | 74.9 | 77.8 | 69.8 |
| Ex. 10 $Ni_{0.73}/Mg_{4.27}Al$ | 59.3 | 65.8 | 70.9 | 72.2 | 75.7 | 68.7 |

As shown in TABLE 7, the hydrogen selectivity increases as the steam-carbon ratio increases from 1:1 to 3:1.

Moreover, similarly as in Examples 1-6, the catalysts with higher specific surface area and surface area of active metal prepared by Preparatory Example 1 showed a high selectivity at the steam-carbon molar ratio of 2:1-3:1, while the hydrogen selectivity abruptly decreased at lower steam-carbon molar ratio. Especially, if the steam-carbon molar ratio is below 1:1, the decomposition reaction due to the carbon deposition seemed dominant over the hydrogen reforming reaction. Furthermore, if steam-carbon molar ratio exceeds 4:1, it seems that more steam was supplied than needed and the contact time decreased, thereby increasing the production of methane and carbon monoxide and decreasing the hydrogen selectivity.

Hence, it is preferable to maintain the steam-carbon molar ratio within 1:1 to 4:1, more preferably 2:1 to 3:1.

Example 11

The catalyst for steam reforming reaction of LPG prepared in Preparatory Example 1 was subjected to the stability test as a function of reaction time at 800° C. under the reaction condition as described in Example 1, and the results are presented in FIG. 1.

As shown in FIG. 1, the hydrogen selectivity was 80% or higher until about 100 hours after the reaction began, while it was slightly decreased and maintained at about 77% after 100 hours. Moreover, at a temperature of 800° C., which falls into the reaction condition according to the present invention, it was ascertained that the conversion of propane and the selectivity of the products were stably maintained and there was no pressure change within the reactor due to the carbon deposition for about 200 hours, when the steam-carbon molar ratio was 3:1 and the space velocity was 10,000 $h^{-1}$.

Comparative Examples 1-4

The reaction was performed same as in Example 1 except using catalysts prepared in Comparative Preparatory Examples 1-3 and 6. At each test temperature, the conversion of propane was 100%, and the hydrogen selectivity is presented in TABLE 8.

Comparative Example 5

The reaction was performed same as in Example 7 except using the catalyst prepared in Comparative Preparatory Example 3, and the hydrogen selectivity at each test temperature is presented in TABLE 8.

Comparative Example 6

The steam reforming reaction was performed same as in Example 1 except using methane as a reactant. The conversions of methane at the temperatures of 600, 650, 700, 750, 800 and 850° C. were 3.5, 8.1, 32.1, 51.9, 81.5 and 93.8%, respectively, and the hydrogen selectivity at each temperature is presented in TABLE 8.

Comparative Example 7

The reaction was performed same as in Example 1 except using methane, oxygen and steam as reactants for the tri-reforming reaction of methane. The conversions of methane at the temperatures of 650, 700, 750, 800 and 850° C. were 59.2, 65.3, 73.8, 84.5 and 91.4%, respectively, and the hydrogen selectivity at each temperature is presented in TABLE 8.

active metal was ascertained to large enough to form carbon deposition and cause deactivation of catalysts due to the carbon deposition. On the contrary, if nickel content is below 10 wt %, the catalytic activity becomes lowered due to a decreased number of reaction active sites for steam reforming reaction of LPG because the amount of active metal is so small and the excess amount of magnesium drastically decreases the surface area.

In the meantime, when the catalyst prepared in Comparative Preparatory Example 3 was used, a mixture of propane and butane in a ratio of 30:70 as a reactant showed lower activity in steam reforming reaction at all the test temperatures than only propane gas as a reactant.

Comparative Examples 6-7 compare the catalytic activity by performing reforming reaction of various hydrocarbons on the same catalyst, and showed results of steam reforming reaction of methane and tri-reforming reaction of methane on the catalyst prepared in Preparatory Example 1, which was the highest in the catalytic activity and the hydrogen selectivity in steam reforming reaction of LPG in the present invention.

When the steam reforming reaction of methane was performed under the same conditions (i.e. the same temperature, space velocity and steam-carbon molar ratio) with the steam

TABLE 8

| | Reaction gas | Catalyst | Effect of temperature (° C.) on hydrogen selectivity (%) | | | | | |
|---|---|---|---|---|---|---|---|---|
| | | | 600 | 650 | 700 | 750 | 800 | 850 |
| Comp. Ex. 1 | Propane:$H_2O$ (S/C = 3.0) | Ni/ $\gamma$-$Al_2O_3$ | 61.0 | 62.8 | 65.3 | 66.6 | 69.5 | 69.6 |
| Comp. Ex. 2 | Propane:$H_2O$ (S/C = 3.0) | Ni/MgO | 63.0 | 63.7 | 66.3 | 67.6 | 70.6 | 71.5 |
| Comp. Ex. 3 | Propane:$H_2O$ (S/C = 3.0) | $Ni_{1.84}$/$Mg_{3.00}$Al | 59.8 | 60.2 | 62.9 | 65.3 | 66.2 | 70.4 |
| Comp. Ex. 4 | Propane:$H_2O$ (S/C = 3.0) | $Ni_{0.19}$/$Mg_{3.38}$Al | 61.2 | 61.8 | 62.5 | 63.4 | 63.9 | 64.6 |
| Comp. Ex. 5 | Propane:butane:$H_2O$ (30:70) (S/C = 3.0) | $Ni_{1.84}$/$Mg_{3.00}$Al | 59.1 | 61.4 | 63.3 | 63.9 | 65.2 | 66.7 |
| Comp. Ex. 6 | Methane:$H_2O$ (S/C = 3.0) | $Ni_{0.50}$/$Mg_{2.50}$Al | 29.6 | 42.2 | 51.5 | 59.2 | 69.6 | 72.2 |
| Comp. Ex. 7 | Methane:$CO_2$:$H_2O$:$O_2$ = 1:1:1:0.1 | $Ni_{0.50}$/$Mg_{2.50}$Al | — | 21.0 | 29.7 | 35.8 | 43.0 | 48.2 |

As shown in TABLE 8, among the catalysts prepared according to the conventional co-precipitation, when Ni/$\gamma$-$Al_2O_3$ catalyst was used, the hydrogen selectivity did not exceed 70% at all test temperatures, and when Ni/MgO catalyst was used, the hydrogen selectivity abruptly decreased at the temperature of 800° C. or lower.

Although the surface area of the Ni/$\gamma$-$Al_2O_3$ catalyst was relatively high, the surface area of the active metal was not so high because nickel was not highly dispersed, thus causing low catalytic activity due to the high carbon deposition with the sintering of nickel in the process of the reaction. The reason why the Ni/MgO catalyst showed high hydrogen selectivity at higher temperature than the Ni/$\gamma$-$Al_2O_3$ catalyst despite a lower surface area of active metal appears that a strong bond between nickel and magnesium inhibits the sintering of nickel.

Moreover, when the impregnation amount of nickel on hydrotalcite support is above 25 wt % or below 10 wt %, the catalysts showed inferior activity at all the test temperature to those where the nickel content is 10-24 wt % according to the present invention. When the nickel content is above 25 wt %, an excess amount of nickel added causes the sintering process of nickel to easily proceed and inhibits the dispersion of nickel particles. As the size of the nickel particle increases, the surface area of active metal decreases and the dispersed reforming reaction of LPG, the convention of methane was 3.5, 8.1, 32.1, 51.9, 81.5 and 93.8% at 600, 650, 700, 750, 800 and 850° C., respectively. As shown in Comparative Example 6, the hydrogen selectivity was remarkably lowered at the test reaction temperatures as compared to the steam reforming reaction of LPG. Moreover, Comparative Example 7, where a tri-reforming reaction of methane was performed to improve the reforming reaction of methane by carbon dioxide, also showed a lower conversion of methane than the conversion of LPG, and the hydrogen selectivity was also lower at a test reaction temperature on the same catalyst as compared to the steam reforming reaction of LPG or methane.

Considering the aforementioned steam reforming reaction of LPG, steam reforming reaction of methane and tri-reforming reaction of methane on the same catalyst, it may be concluded that the catalytic activity varies considerably depending on the kind of the hydrocarbons although the reforming reaction of hydrocarbons is performed on the same catalyst. It was also ascertained the nickel-based catalyst prepared using hydrotalcite-like precursor according to the present invention shows superior conversion of LPG and hydrogen selectivity in the steam reforming reaction of LPG. That is, although the same catalyst is used, the conversion of hydrocarbons and the hydrogen selectivity may greatly vary depending on the kind of reforming reaction of hydrocarbons, and cannot be same. Hence, although there is prior disclosure where a catalyst similar to the catalyst for steam reforming reaction of LPG according to the present invention is used in a different technical field, it is difficult to obtain the same effect.

The present invention is characterized in that catalysts with optimized contents for superior activity and hydrogen selectivity in steam reforming reaction of LPG is selected and used.

Comparative Example 8

The reaction was performed same as in Comparative Example 1 except using the catalyst prepared in Comparative Preparatory Example 2. The effect of steams on the reaction was investigated at 800° C. while maintaining the steam-carbon molar ratio within 1-4:1, and the results are presented in TABLE 9.

Comparative Examples 9-10

The reaction was performed same as in Comparative Example 6 except using the catalysts prepared in Comparative Preparatory Examples 3 and 6, respectively, and the results are presented in TABLE 9.

TABLE 9

| Catalyst | | Effect of steam-carbon ratio on hydrogen selectivity (%) | | | | | |
|---|---|---|---|---|---|---|---|
| | | 1:1 | 1.5:1 | 2:1 | 2.5:1 | 3:1 | 3.5:1 |
| Comp. Ex. 8 | Ni/MgO | 63.0 | 67.3 | 68.7 | 68.8 | 70.6 | 67.4 |
| Comp. Ex. 9 | $Ni_{1.84}/Mg_{3.00}Al$ | 54.6 | 59.7 | 62.8 | 64.1 | 66.2 | 64.3 |
| Comp. Ex. 10 | $Ni_{0.19}/Mg_{3.38}Al$ | 58.2 | 60.3 | 61.7 | 62.6 | 63.9 | 62.8 |

As shown in TABLE 9, as the steam-carbon molar ratio increases from 1:1 to 3:1, the hydrogen selectivity increased similarly as in Examples 8-9. Moreover, during the aforementioned reaction, the hydrogen selectivity was higher when the steam-carbon molar ratio was 2:1 or higher than it was below 2:1. When the steam-carbon molar ratio exceeds 4:1, it seems that more steam was supplied than needed, resulting in the increase of energy cost and the hydrogen selectivity decreased due to the decrease in contact time.

Comparative Example 11

Figure 2:
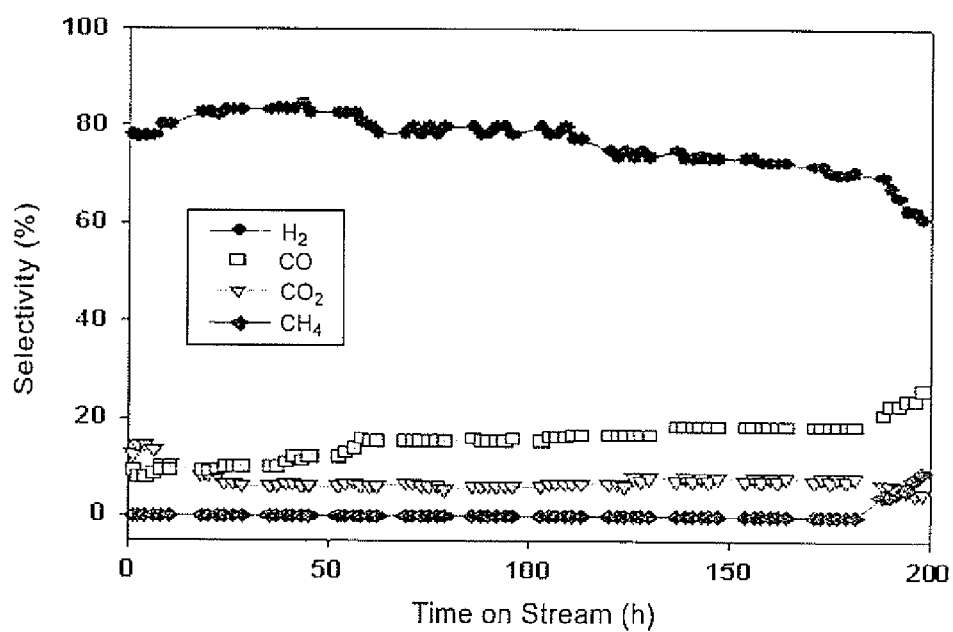
FIG. 2 is a result of evaluating the stability for steam reforming of LPG over commercially available catalyst for steam reforming of methane (ICI company, United Kingdom) as a function of time at 800° C.

In evaluating the stability of a catalyst according to reaction time the reaction was performed same as in Example 11 at 800° C. except using a catalyst for a steam reforming of methane that is commercially available from ICI company instead of the catalyst prepared in Preparatory Example 1, and the results are presented in FIG. 2.

As shown in FIG. 2, although the hydrogen selectivity was about 82% at the beginning of the reaction, it gradually decreased as the reaction proceeded. The hydrogen selectivity slowly decreased until 50 hours after the reaction began, and it decreased to 71% after 100 hours from the beginning of the reaction. After 180 hours, the catalysts abruptly began to be deactivated and the hydrogen selectivity decreased to 65%, thus increasing the pressure in the reactor. After 200 hours, the hydrogen selectivity decreased to 59% with a drastic increase of the pressure in the reactor, and the choking of the reaction happened due to the carbon deposition.

Comparing the catalyst for a steam reforming of LPG according to the present invention (Example 11) as in FIG. 1 and the commercially available catalyst for a steam reforming of methane (Comparative Example 11, ICI company) as in FIG. 2, the catalysts prepared in Preparatory Example 1 according to the present invention maintained the durability for 200 hours, which is superior to the commercially available catalysts (ICI company).

As the reaction proceeds, the commercially available catalyst (ICI company) began to be deactivated due to carbon deposition during the steam reforming reaction of LPG. On the contrary, the nickel-based hydrotalcite catalyst prepared in Preparatory Example 1 according to the present invention showed a hydrogen selectivity of higher than 77% and a superior durability for 200 hours.

As described above, compared to the conventional nickel-based catalyst, the Ni/MgAl catalysts, prepared using a hydrotalcite-like precursor according to the present invention, showed higher specific surface area of catalysts and surface area of active metal. Moreover, the catalysts according to the present invention showed superior catalytic activity in the steam reforming reaction of LPG as compared to the nickel-based catalysts prepared according to a conventional impregnation, which is due to the fact that the active nickel that is dispersed in a highly uniform state onto an inner part as well as a surface of the catalyst inhibits the carbon deposition and maintains the catalytic activity. In particular, during the steam reforming reaction of LPG, the aforementioned nickel-based catalyst prepared using the hydrotalcite-like precursor generates hydrogen-rich gas for a long period of time in a more stable state and at a higher yield as compared to the commercially available catalyst for steam reforming reaction of methane (ICI company, United Kingdom). Hence, the aforementioned catalysts according to the present invention are expected to be very useful for producing a hydrogen-rich gas during the steam reforming reaction of LPG in a hydrogen station for the fuel cell powered vehicle or a fuel processor for fuel cell or petroleum chemical process.

What is claimed is:

1. A nickel-based catalyst for steam reforming reaction of LPG prepared by impregnating a hydrotalcite precursor of Formula (I):

$$Ni_x/Mg_yAl \quad (I)$$

wherein x and y are molar ratios of Ni and Mg, respectively, relative to Al; x is 0.25-1; y is 0.6-5.5; and x/y is 0.15-0.45, with 10-24 wt. % of active nickel, wherein the wt. % is relative to the nickel-based catalyst prepared.

2. The nickel-based catalyst of claim 1, wherein the specific surface area of the catalyst is 100-300 m²/g and the surface area of the active ingredient, nickel, is 10-30 m²/g.

3. A process for steam reforming of LPG, which comprises the step of producing hydrogen-rich gas by performing steam reforming of LPG in the presence of a nickel-based catalyst of Formula (I) at a temperature of 700-950° C., a space velocity of 2,500-250,000 h⁻¹, and steam to carbon ratio of 1-4 to 1:

$$Ni_x/Mg_yAl \quad (I)$$

wherein x and y are molar ratios of Ni and Mg, respectively, relative to Al; x is 0.25-1; y is 0.6-5.5; and x/y is 0.15-0.45.

4. The process of claim 3, wherein the steam is used in an amount of 1-4 moles relative to one mole of carbon.

5. The process of claim 3, wherein the LPG contains propane, butane and a mixture thereof.

6. The process of claim 5, wherein propane and butane are contained in a volume ratio of 10-40:60-90.

* * * * *